April 12, 1938.  J. G. KERSHAW  2,113,988
AUTOMATIC OPERATING MECHANISM IN FEED HOPPERS
Original Filed Aug. 3, 1934  5 Sheets-Sheet 1
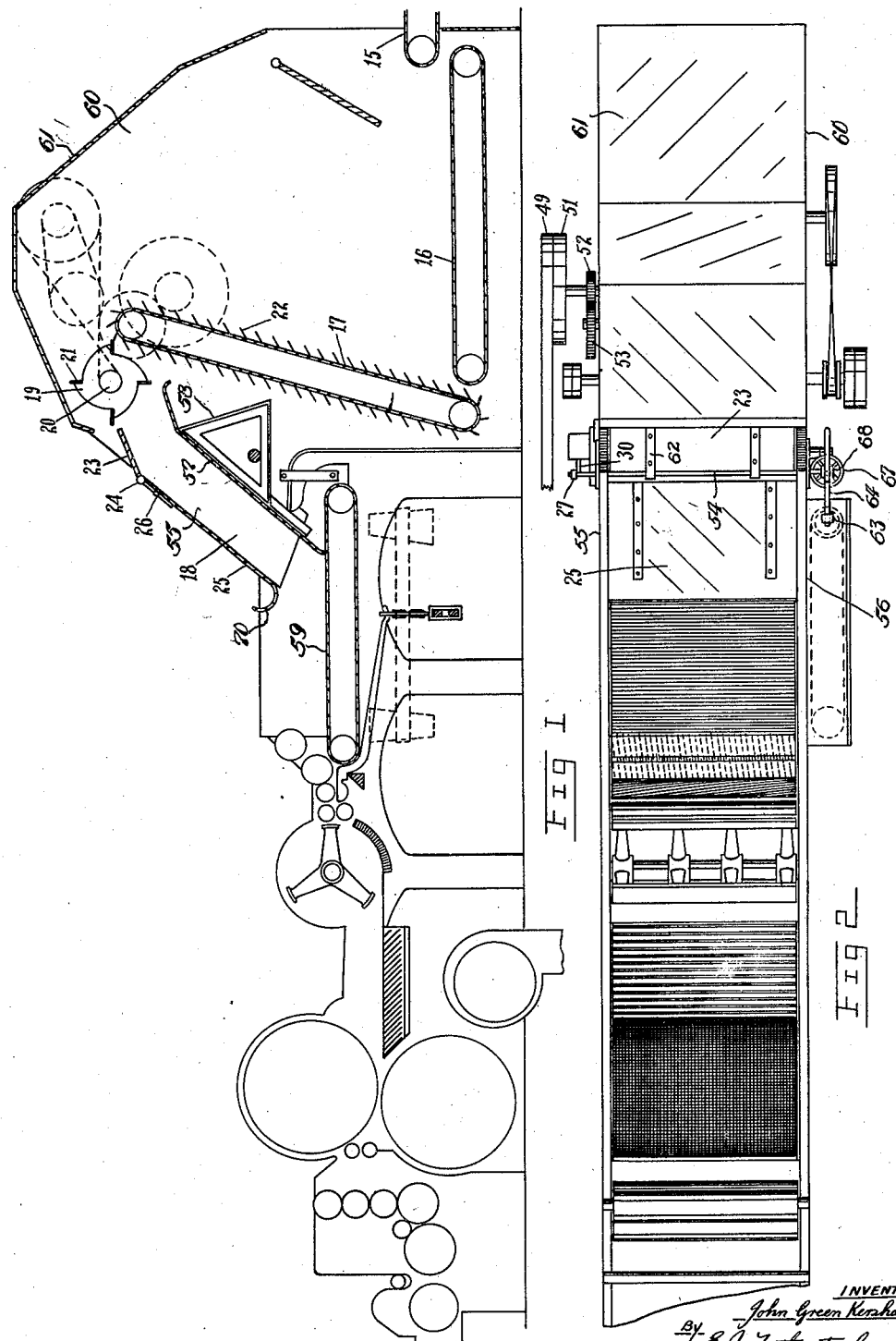

April 12, 1938.  J. G. KERSHAW  2,113,988
AUTOMATIC OPERATING MECHANISM IN FEED HOPPERS
Original Filed Aug. 3, 1934  5 Sheets-Sheet 2

INVENTOR
John Green Kershaw
By E. J. Fetherstonhaugh
ATTORNEY

April 12, 1938.　　　J. G. KERSHAW　　　2,113,988
AUTOMATIC OPERATING MECHANISM IN FEED HOPPERS
Original Filed Aug. 3, 1934　　5 Sheets-Sheet 3

INVENTOR
John Green Kershaw
By
E. J. Fetherstonhaugh
ATTORNEY

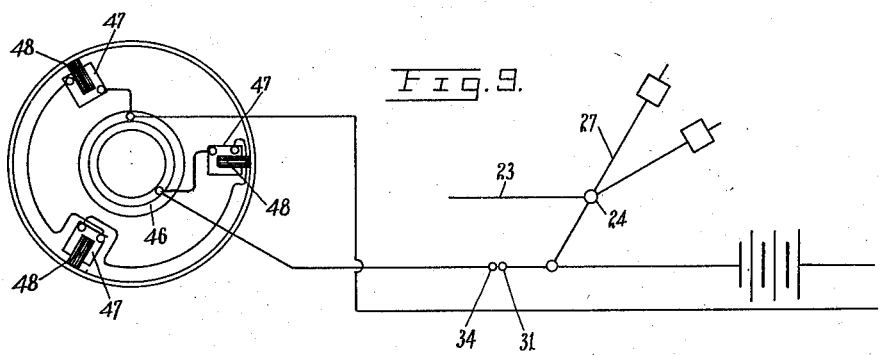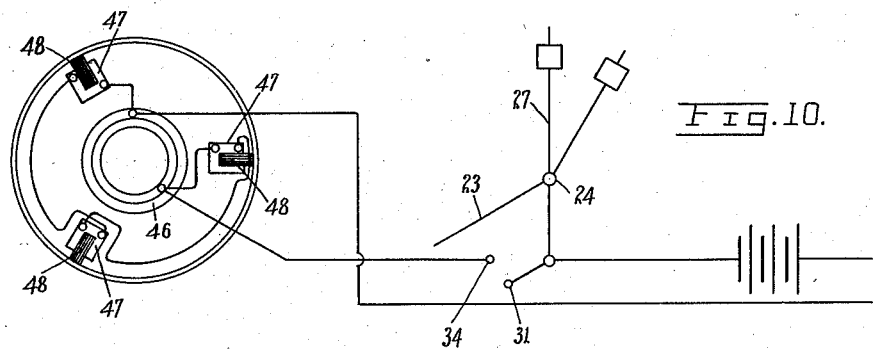

April 12, 1938. J. G. KERSHAW 2,113,988
AUTOMATIC OPERATING MECHANISM IN FEED HOPPERS
Original Filed Aug. 3, 1934 5 Sheets-Sheet 5
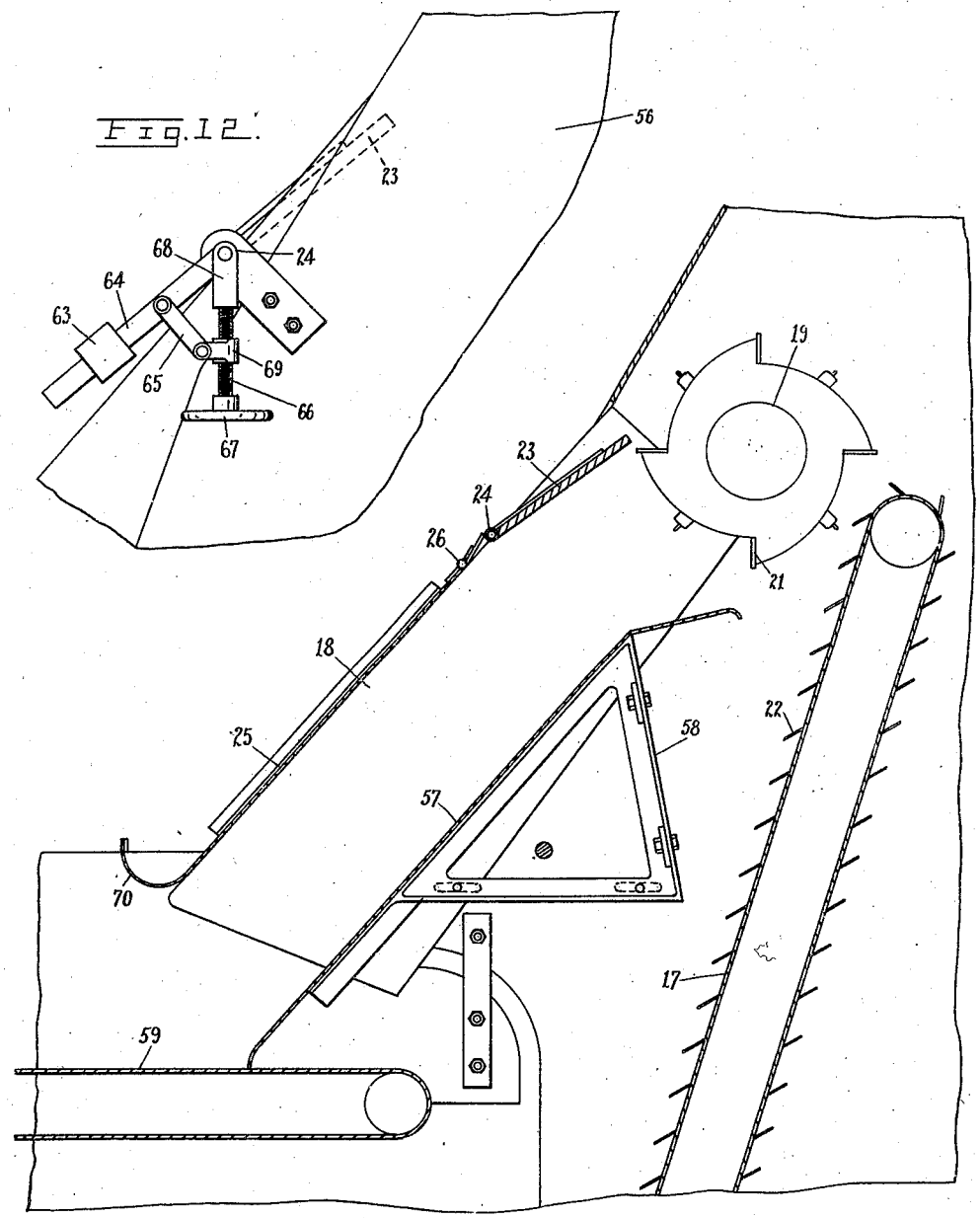

Patented Apr. 12, 1938

2,113,988

UNITED STATES PATENT OFFICE 2,113,988

AUTOMATIC OPERATING MECHANISM IN FEED HOPPERS

John Green Kershaw, Drummondville, Quebec, Canada, assignor to Dominion Textile Company Limited, Montreal, Quebec, Canada Original application August 3, 1934, Serial No. 738,282. Divided and this application May 22, 1935, Serial No. 22,821

15 Claims. (Cl. 19—69)

The invention relates to an automatic operating mechanism in feed hoppers, as described in the present specification and illustrated in the accompanying drawings that form part of the same.

The invention consists essentially in the electro-magnetic release mechanism whereby the feed carrier is electrically connected in so far as its operating members are concerned to an enlarging throat member adapted to de-energize the magnets coincidently with the choking effect as pointed out in the claims for novelty following a description in detail of the features of construction.

The objects of the invention are to maintain an even feed in scutching and picking machines or the like, corresponding to the size of the throat of the feed entrance and to do this automatically in order that unforeseen stoppages or blockages of the intermediate parts of the machine or machines shall be avoided, as described more fully in the specification attached to the application filed under Serial Number 738,282, on August 3rd, 1934 of which this application is a division, and generally to provide a flexible automatic stop and start mechanism and to automatically determine the quantities fed into the machine.

In the drawings, Figure 1 is a longitudinal sectional view of one form of machine in which the operating member for the electro-magnetical control of the hopper feed mechanism is shown.

Figure 2 is a plan view of the machine as illustrated in Figure 1.

Figure 9 is a diagrammatic view showing the electrical mechanical moving parts for effecting the operation of the magnetic clutch and showing the switch closed.

Figure 10 is a similar view to that in Figure 9 showing the switch open.

Figure 11 is a vertical sectional view of the delivery section of a hopper feeder containing the quantity controller and showing a beater.

Figure 12 is a detail showing the capacity adjusting mechanism in the quantity controller.

Like numerals of reference indicate corresponding parts in the various figures.

Figure 3:
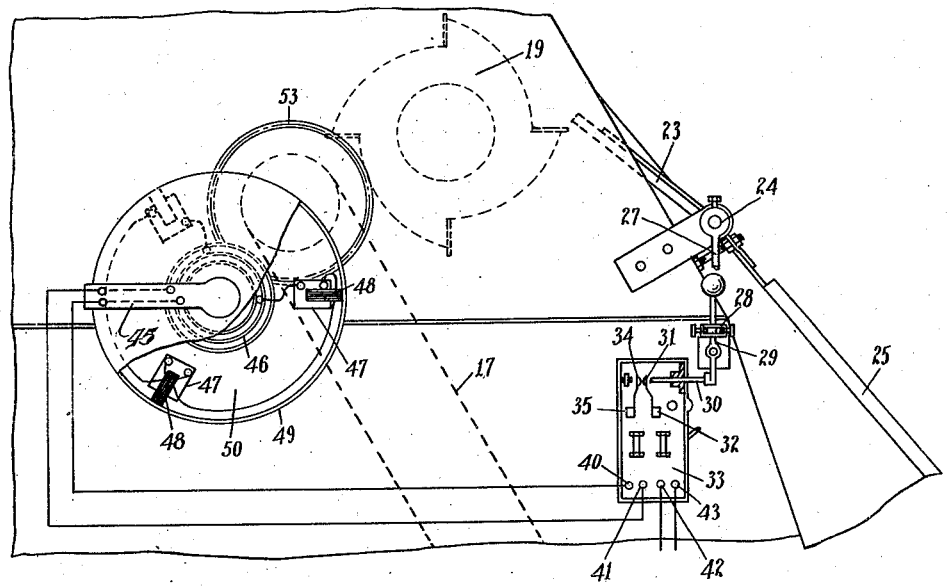
Figure 3 is a plan view of the electro-magnetical clutch mechanism in engagement with the feed carrier to the hopper and showing the electrical connections to the magnets and the mechanical switch connections from the automatically operated wall section of the hopper.
Figure 4:
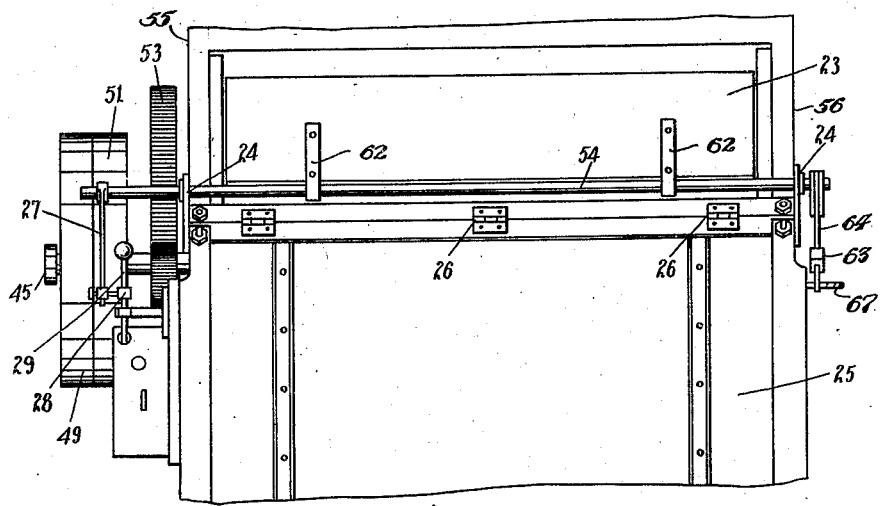
Figure 4 is an elevational view showing the automatically operated wall section or door connected with the clutch mechanism.
Figures 5, 6, 7:
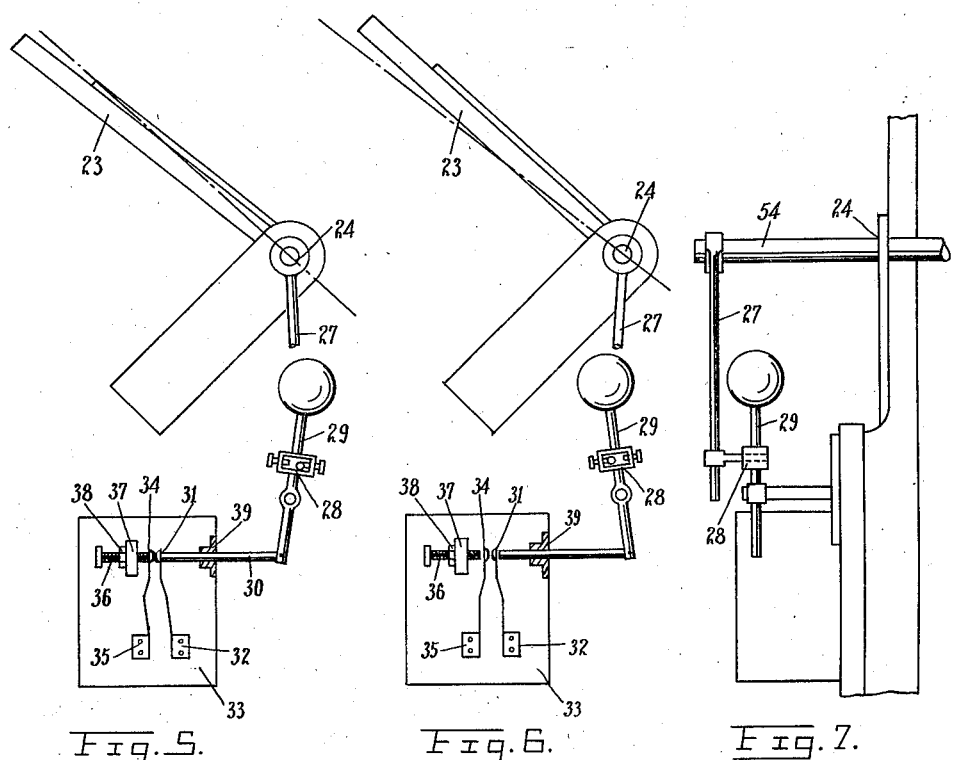
Figure 5 is a detail showing the door wall section apart from the hopper and the spring operating mechanism with the contacts in their closed position.
Figure 6 is a similar view with the contacts open.
Figure 7 is a view of the same parts as illustrated in Figures 5 and 6 and at right angles thereto.
Figure 8:
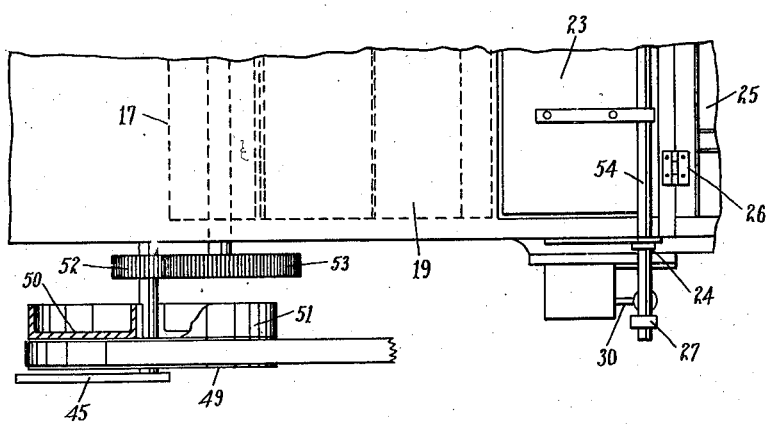
Figure 8 is a plan view of the spring contact mechanism illustrated in Figures 5, 6 and 7.

The introduction of mechanism for the control of density of feed at the mouth of the delivery section is a considerable advance in itself in machinery used in the manufacture of cotton or other fibrous products, in fact in any machine in which choking may occur in the throat of the delivery section and the adaptation of electromagnetical force in the driving mechanism very much facilitates the communication between the actual delivery section inlet and said driving mechanism, for the release or engagement of the clutch mechanism instantly is essential to a good performance.

The particular form of hopper feeder described need not be used but it has been found that it very much helps in the production, not only in using this particular form of operating gear, but largely contributes to the efficiency, especially in the cotton field manufacture, and therefore for a good understanding of the invention the same form of hopper feeder is used as is illustrated and described in the application for a patent mentioned in the foregoing.

Referring to the drawings, following the breaking of the bales and rough cleaning, the stock reaches the carrier or carriers indicated by the numeral 15, and it is on to this carrier mechanism that the stock or cotton, as it will be generally called in this description, for convenience sake, will be transported and this cotton, which has been roughly cleaned, feeds on to the carrier 16 and is elevated by the carrier 17 to the delivery section of the hopper feeding machine.

The beater 19 is formed with a hub mounted on the driven shaft 20, and from which the blades 21 project radially and extend across the machine. The beater 19 is at the mouth of the delivery section 18, and its blades strip the cotton from the carrier apron 17 and propel it forward into the delivery section. The dust, dirt, leaf, sticks and other extraneous matter fall on the ground. This carrier being rearwardly inclined from the vertical, the teeth 22 lift the cotton up on the leaning face and carry it to the beater 19, which is practically at the mouth of the delivery section.

This mechanism, so far as it has been described is conventional construction and the novel features begin with the passage of the cotton into the delivery section. Naturally the rotation of the blades in a downward direction strips the cotton from the spikes of the apron carrier 17, driving it into the mouth of the delivery section, and this partially cleaned cotton continues passing in a mass in so far as the capacity of the delivery section will permit.

The delivery section construction may include a top wall formed of two hinged door sections, the uppermost door constituting a yielding member capable of being pushed outwardly by an increasing mass of cotton which builds up after the delivery section becomes full, tending to choke the throat of the delivery section, and therefore relief must be obtained by hesitation or stoppage of the apron carrier 17. The result of this outward door movement is the temporary cessation of the feed, as will be explained more fully hereinafter.

This door 23 as a yielding member is pivotally secured in the bearings 24, while the cover door 25 is secured in the pivot bearings 26.

The movement of the door 23 outwardly rotates the pivot pin 54, which in turn operates the arm 27 in the slot 28 of the weighted pivoted lever 29, this lever being swivelly connected with a push pin 30.

The push pin 30 engages the back of the spring switch contact 31 secured through the flange 32 to a baseboard 33 containing the switch mechanism.

The coacting spring contact 34 extends from the flange 35 secured to said baseboard and the adjustment of this contact 34 is by means of the threaded pin 36 screwing into and through the stop 37 and held by the lock nut 38 in position.

The push pin 30 is shown as sliding in the bracket 39 rigidly secured to said baseboard. The binding posts 40 and 41 are respectively connected to the switch contacts through corresponding binding posts in the switch contact flange and similarly the leads 42 and 43 to the power are connected to said switch flanges, but the binding posts 40 and 41 are directly connected to the magnetic clutch 44 through the arm 45, the commutator 46 to the electro-magnetic clutch coils 47 having the clutch cores 48.

These electro-magnetic clutch coils 47 are fast within the driving pulley 49 which is a slack pulley and constantly rotated by a driving belt.

As soon as the pressure of the cotton on the door 23 is released the switch contacts 31 and 34 are brought together which energizes the electromagnets fixed in the pulley 49 which with the cores complete a magnetic circuit with the clutch plate 50 formed in the driven pulley 51 thereby creating a pull between the pulleys 49 and 51 and consequently holding the pulley 51 through a suitable friction face to rotate with the pulley 49 and in turn driving the elevating carrier through the intervening gears 52 and 53.

The feed on the carriers 15 and 16 leading to the elevating carrier apron 17 is interrupted through the action of the regulating door 23, and it may be said that this feed to the elevating carrier is independently driven and is quite another mechanism.

The side walls 55 and 56 of the delivery section are fixed and form part of the main casing of the machine, while the bottom wall 57 and the sectional top wall are adjustable and have independent functional movements in controlling the feed of the cotton.

The adjustable bottom wall 57 can be moved in a horizontal direction, backwardly or forwardly in the boxlike structure and is carried on the triangular frame 58 towards and away from the cover door 25, but remaining parallel therewith always leaving sufficient space for the cotton to pass, according to the amount desired, which is controlled by the action of the upper hinged door 23. The cover door 25 has a smoothing effect on the cotton when brought into contact with it through the manipulation of the adjustable bottom 57.

The delivery section empties the cotton on to a wood slat apron carrier 59 for further treatment.

The outer casings 60 and top plate 61 are in the nature of cover plates, enclosing the feed end of the machine and extend forwardly as far as the delivery section. The side walls of the outer casing partitions extend throughout the length of the machine, and it is from these side walls that the bearings 24 extend in the form of brackets to support the pivot pins 54 of said door 23. The barrel 62 of the hinge terminates this door at the inner end and is fast on the pin 54, and at one end the balance weight 63 is adjustably mounted on the arm 64, which projects from the pivot pin and is keyed thereto. This arm 64 is connected by the link 65 to the adjusting screw 66, this screw having the operating handle 67 and turning in the clevis block 68, which is pivotally mounted on the end of the pivot pins 54, the link 65 being pivotally secured to the arm at one end and to the nut 69 at the other end, the latter being mounted on said screw for adjusting purposes.

The turning of the screw by means of the handle 67 changes the angular position of the arm 64 in relation to the screw 66 as the nut 63 travels upwardly or downwardly on the screw pivoting the arm 64 by the connecting link 65 and consequently the door 23 to the desired adjusted position.

If the nut is moved towards the wheel or handle, the door 23 is moved outwardly when it will allow a greater mass of cotton to pass into the delivery section before causing the apron carrier 17 to stop. If the nut is moved away from the wheel, the opposite effect is obtained. This adjustment is necessary in order to process different types and grades of fibrous material, or different weights of lap required.

The outer end of the pivot pin 54 is connected by the lever 27 to the electrically and mechanically operated parts for starting and stopping the feed, and in this connection, the door 23 itself becomes the mechanically operated lever due to the pressure from within the throat of the delivery section tending to push the door outwardly.

The operation of the door 25 is manual, and this door is lifted by the handle 70 projecting from the lower end, and the door only needs to be opened to determine the condition of the fibrous material within the hopper.

Briefly the operation of this invention includes the feeding of the cotton in the horizontal and vertical carriers, as it comes from the bale, and the emptying of this cotton into the mouth of the delivery section in the path of the beater.

The elevation of the cotton brings it up into contact with the beater, which is a primary opening machine. The beater strips the cotton from the spikes of the apron carrier, throwing it into the throat of the delivery section. The feed remains constant so long as there is no choking in the mouth or throat of the delivery section, but this choking will occur periodically because it is necessary to feed a small surplus over the actual requirements to make a lap of even weight. When the choking occurs the door 23 is pushed outwardly and cuts off the electrical current to the electro-magnets and to put the elevating feed carrier out of commission.

The electro-magnetic mechanism is energized to maintain two pulleys in clutch, one a loose pulley and the other a fixedly mounted pulley and this electro-magnetic equipment is wired to the yieldable door at the hopper mouth, so that when the feed becomes too abundant and chokes the throat of the hopper, the yieldable member pushes outwardly and breaks the contact supplying electrical energy to the coils and these in turn cease operating on the cores to part the two pulleys, and it is then that the upright carrier fails to elevate any more cotton, until the beater has cleared the way and relieved the throat of the hopper, then the contacts are brought together, in other words, the switch is closed and the machine resumes normal operation.

What I claim is:—

1. In automatic operating mechanism in feed hoppers, a feed carrier, a driven rotor engaging said carrier, a delivery section, a movable member in said delivery section contacting with the material fed thereinto and reaching an actuating position on the choking of the delivery section throat, a pulley constantly driven and a clutch disc having a gear coacting with said driven rotor, an electro-magnetic clutch mounted in said pulley and including a commutator, a source of electric current, an operating circuit including the magnetic clutch and the clutch disc operatively connected to each other when the circuit is completed and an electric switch mechanism closing a break in said circuit and mechanically operated from the delivery section on the occurrence of the choking action in the throat.

2. In automatic operating mechanism in feed hoppers, a feed carrier, a driven rotor engaging said carrier, a delivery section, a movable member in said delivery section, contacting with the material fed thereinto and reaching an actuating position on the choking of the hopper throat, a pulley constantly driven and having a plurality of electro-magnets, clutch coils containing clutch cores and a commutator, a clutch disc connected to said driven rotor, a source of electric current, an operating circuit including the electro-magnetic clutch of said pulley and the clutch disc operatively connected to each other when the circuit is completed and an electric switch mechanism closing a break in said circuit and mechanically operated from the delivery section on the occurrence of the choking action in the throat.

3. In automatic operating mechanism in feed hoppers, a feed carrier, a driven rotor engaging said carrier, a delivery section, a movable member in said delivery section contacting with the material fed thereinto and reaching an actuating position on the choking of the delivery section throat, a pulley constantly driven and a clutch disc having a gear coacting with said driven rotor, an electro-magnetic clutch mounted in said pulley and including a commutator, an arm journalled to the pulley support, a source of electric current, an operating circuit connected to the electro-magnetic clutch through said arm and the clutch disc operatively connected when the circuit is completed, an electric switch mechanism closing a break in said circuit and having switch spring contacts controlled by a push pin, and mechanical means for moving the push pin against the spring contacts and operated from the delivery section on the occurrence of the choking action in the throat.

4. In automatic operating mechanism in feed hoppers, a feed carrier, a driven rotor engaging said carrier, a delivery section, a movable member in said delivery section contacting with the material fed thereinto and reaching an actuating position on the choking of the delivery section throat, an electromagnetic clutch, a clutch disc operatively connected to the driven rotor of said carrier, a source of electric current, an operating circuit including the magnetic clutch and the clutch disc operatively connected to each other when the circuit is completed, an electric switch mechanism closing a break in said circuit and having spring contacts and a spring contact push pin, a pivoting member secured to said movable member and operating a weighted pivoted lever operatively contacting said push pin, said circuit being closed through the movements of the movable member in the delivery section on the occurrence of the choking action in the throat.

5. In automatic operating mechanism in feed hoppers, a feed carrier, a driven rotor engaging said carrier, a delivery section, a movable member in said delivery section contacting with the material fed thereinto, and reaching an actuating position on the choking of the delivery section throat, an electro-magnetic clutch, a clutch disc operatively connected to the driven rotor of said carrier, a source of electric current, an operating circuit including the magnetic clutch, and the clutch disc operatively connected to each other when the circuit is completed, an electric switch mechanism, a pivot pin rotated by said movable member and carrying a crank arm operating a teetering weight for opening and closing the electrical contacts of said switch and operated from the delivery section on the occurrence of the choking action and its release in the throat.

6. In a quantity controller in hopper feeding machines, a delivery section having a throat portion, a yielding member at its inlet end and extending beyond the throat portion, bearing members secured to the side walls of said delivery section and having a pivot pin journalled therein, a hinged barrel member mounted on said pivot pin and secured to said yielding member, a weighted arm and clevis block mounted on one end of said pivot pin, an adjusting screw engaging with said clevis block and having an operating handle, a link member secured at one end to said weighted arm and at the other end to a nut engaging said adjusting screw, feed carriers, means for driving said carriers, a declutching mechanism for retarding said carriers at each choking tendency of the material fed into the delivery section throat and means operatively connecting said yielding member to the declutching mechanism.

7. In a quantity controller in hopper feeding machines, a delivery section having a manually operated door section and a yielding door section operated by the feed, pivoted means for each of said manually operated door section and said yielding door section and journalled in the delivery section walls, means for adjusting said yielding door section to a selected normal position and connected to the pivoted means thereof, feed carriers and means for driving said feed carriers, and electrical and mechanical means for starting and stopping said feed carriers and operatively connected to the pivoted means of said yielding door section.

8. In a quantity controller in hopper feeding machines, a delivery section having a throat portion, a yielding member at its inlet and extending beyond the throat portion, and operated by pressure of incoming material and turning a hinge pin, an elevating feed carrier directed at its upper end to said throat and means for driving said feed carrier, a clutch mechanism in said driving means including mechanical and electrical means, and a stop mechanism controlled by the excess of material feeding into said delivery section operatively connecting the hinge pin of said yielding member and said clutch mechanism for starting and stopping said feed carriers.

9. In a quantity controller in hopper feeding machines, a delivery section having a throat portion, a yielding member at its inlet and extending beyond the throat portion, pivoted means secured to said yielding member and journalled in the side walls of said delivery section, a weight and adjusting means secured to one end of said pivoted means, an elevating feed member transporting the material to said delivery section, a driving mechanism for said feed member, and a stop mechanism including mechanical and electrical means applied to said driving mechanism and connected to the other end of said pivoted means to stop the driving mechanism by the movement of said yielding member.

10. In a quantity controller in hopper feeding machines, a delivery section having a throat portion, a yielding member at its inlet end and extending beyond the throat portion, bearing members secured to the side walls of said delivery section and having a pivot pin journalled therein, a hinged barrel member mounted on said pivot pin and secured to said yielding member, a weight arm secured to one end of said pivot pin and carrying a balancing weight, an elevating feed carrier, and means for driving said feed carrier, a mechanism for retarding said carrier at each choking tendency of the material fed into the delivery section throat and mechanical and electrical means operatively connecting said yielding member to the retarding mechanism.

11. In a quantity controller in hopper feeding machines, a delivery section having a throat portion, a yielding member at its inlet end and extending beyond the throat portion, hinged members secured to said yielding member, a weighted member connected to said yielding member, adjustable means for controlling the length of travel of said yielding member and secured thereto, an elevating feed carrier and means for driving said feed carrier, a declutching mechanism for retarding said carrier at each choking tendency of the material fed into the delivery section throat, and mechanical and electrical means operatively connecting said yielding member to the declutching mechanism.

12. A scutching or picker machine, comprising an endless carrier having a gear drive, a pulley constantly driven, a clutch disc having a gear coacting in the aforesaid drive, an electro-magnetic clutch carried by said pulley and engaging said clutch disc and having electrical connections therefrom, a delivery section for cotton having a yielding control member including a pivot pin rotated thereby and carrying a crank arm operating a teetering weight for opening and closing an electrical contact governing the engagement of said pulley with said clutch disc, and means for dressing the cotton to complete a lap.

13. A scutching and picking machine, comprising an endless carrier having a gear drive, a pulley having a clutch face connected with said drive, a pulley constantly driven facing said clutch face and having electro-magnetic clutch mechanism, a feed passage having a sectional upper wall forming two hinged doors, one for inspection purposes and the other for controlling the feed of cotton, a hinge pin in said controlling door, an electric switch arm connected with said hinge pin and having connections with said electro-magnetic clutch mechanism for completing the magnetic circuit between the pulleys to connect the drive to said carrier, and means for dressing the cotton to complete a lap.

14. A scutching and picking machine, comprising an endless carrier having a gear drive, a pulley having clutch face connected with said drive, a pulley constantly driven facing said clutch face and having electro-magnetic clutch mechanism, a feed mechanism having a sectional upper wall forming two hinged doors, one for inspection purposes and the other for controlling the feed of cotton, a hinge pin constituting a crank rod, an electric switch arm connected with said hinge pin and having electrical connections with said electro-magnetic mechanism to energize said magnets when the switch is closed and complete the magnet circuit between the driven pulley and the clutch face, to connect the drive to said carrier and means for collecting the cotton from said feed mechanism and means for dressing the cotton to complete a lap.

15. A scutching or picker machine, comprising an endless carrier mounted on a pulley having a gear drive, a clutch disc having a gear coacting in the aforesaid drive, a pulley constantly driven, a clutch mechanism in said pulley normally cooperating with said clutch disc in the driving movement, a feed passage having a hinged door adjustably positioned on a hinge pin, a weighted arm mounted on said pin and balancing said door, an adjusting screw and nut mounted on the door hinge pin and linked to the weighted arm for widening and narrowing the feed passage mouth, and scutching and picking means.

JOHN GREEN KERSHAW.